July 26, 1949.    E. O. SCHWEITZER, JR    2,477,423
SYNCHRONOUS CASCADE DYNAMOELECTRIC UNIT
Filed Feb. 17, 1945    2 Sheets-Sheet 1
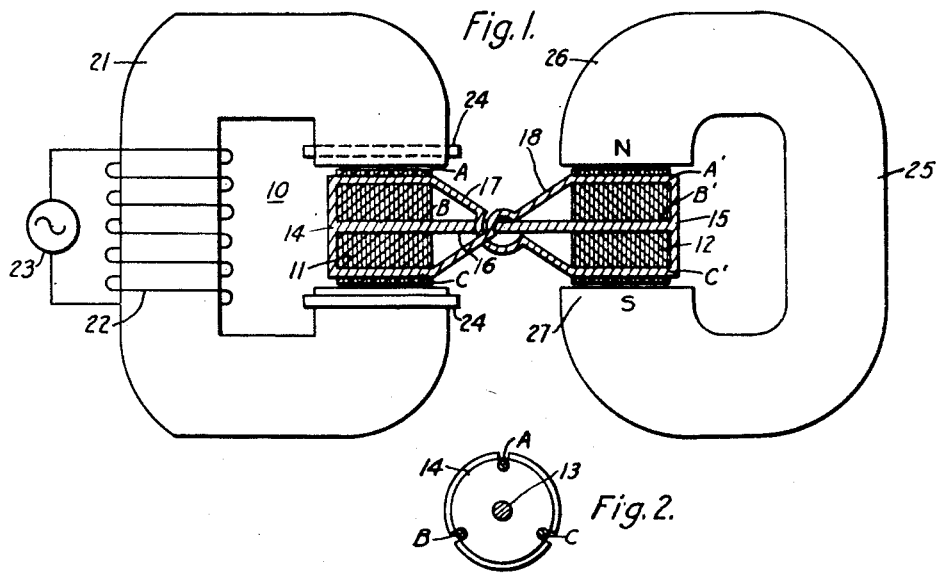
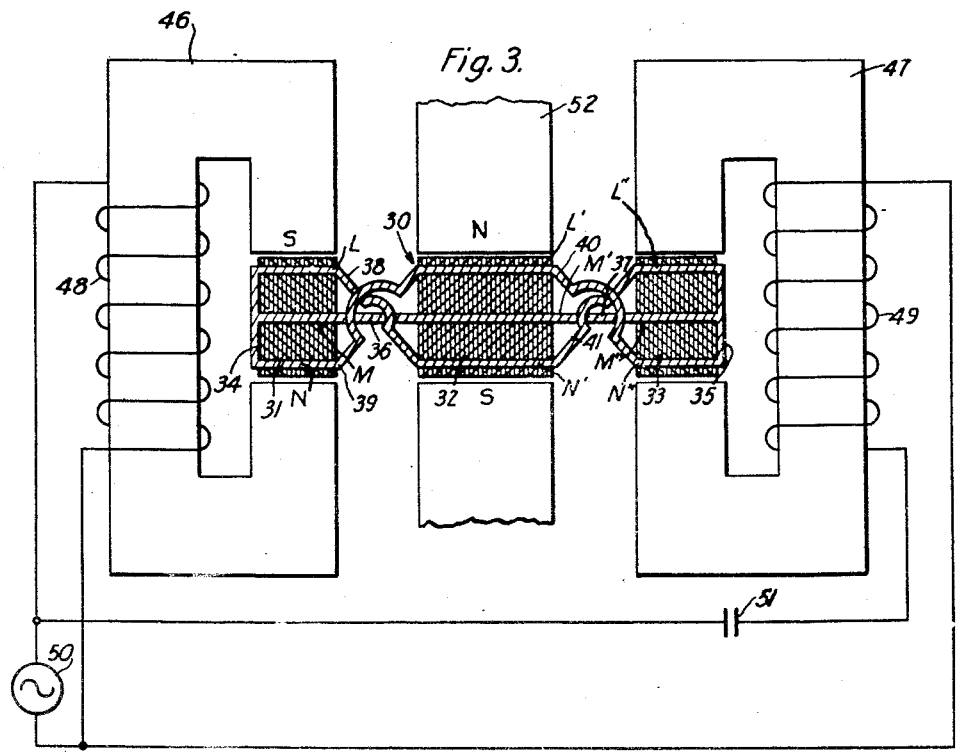
INVENTOR
Edmund O. Schweitzer, Jr.
BY
ATTORNEY July 26, 1949.  E. O. SCHWEITZER, JR  2,477,423
SYNCHRONOUS CASCADE DYNAMOELECTRIC UNIT
Filed Feb. 17, 1945  2 Sheets-Sheet 2

INVENTOR
Edmund O. Schweitzer, Jr.
BY
ATTORNEY

Patented July 26, 1949

2,477,423

UNITED STATES PATENT OFFICE 2,477,423

SYNCHRONOUS CASCADE DYNAMO-ELECTRIC UNIT

Edmund O. Schweitzer, Jr., Northbrook, Ill.

Application February 17, 1945, Serial No. 578,485

3 Claims. (Cl. 318—47)

This invention relates, generally, to dynamo-electric devices and it has particular relation to synchronous motors.

An object of this invention is to cause an alternating current motor to operate at a predetermined synchronous speed.

Another object of this invention is to reverse the phase rotation in a section of a polyphase rotor from the phase rotation in another section thereof and to cause a unidirectional magnetic field to cooperate with the flux of the reversed phase for limiting the rotor speed to a predetermined fraction of its full synchronous speed.

Still another object of this invention is to operate one polyphase section of a rotor in an alternating magnetic field and another polyphase section of the rotor in a unidirectional field, the phase rotation of the second section being the reverse of the phase rotation of the first section.

A further object of this invention is to telescope the reversed polyphase sections of the rotor and to provide an alternating field for cooperating with one section to drive the rotor and a unidirectional field for cooperating with the other section for limiting the rotor speed to a predetermined synchronous speed.

Other objects of this invention will, in part, be obvious and in part appear hereinafter.

For a more complete understanding of the nature and scope of this invention reference can be had to the following detailed description, taken together with the accompanying drawings in which:

Figure 1 illustrates, diagrammatically, one embodiment of this invention, the rotor being in two sections with an alternating current electromagnet cooperating with one section and a permanent magnet cooperating with the other section;

Figure 2 is an end view of the rotor shown in Figure 1 and illustrates the arrangement of the conductors forming the polyphase winding;

Figure 3 illustrates, diagrammatically, another embodiment of this invention in which the rotor is divided into three sections;

Figure 4:
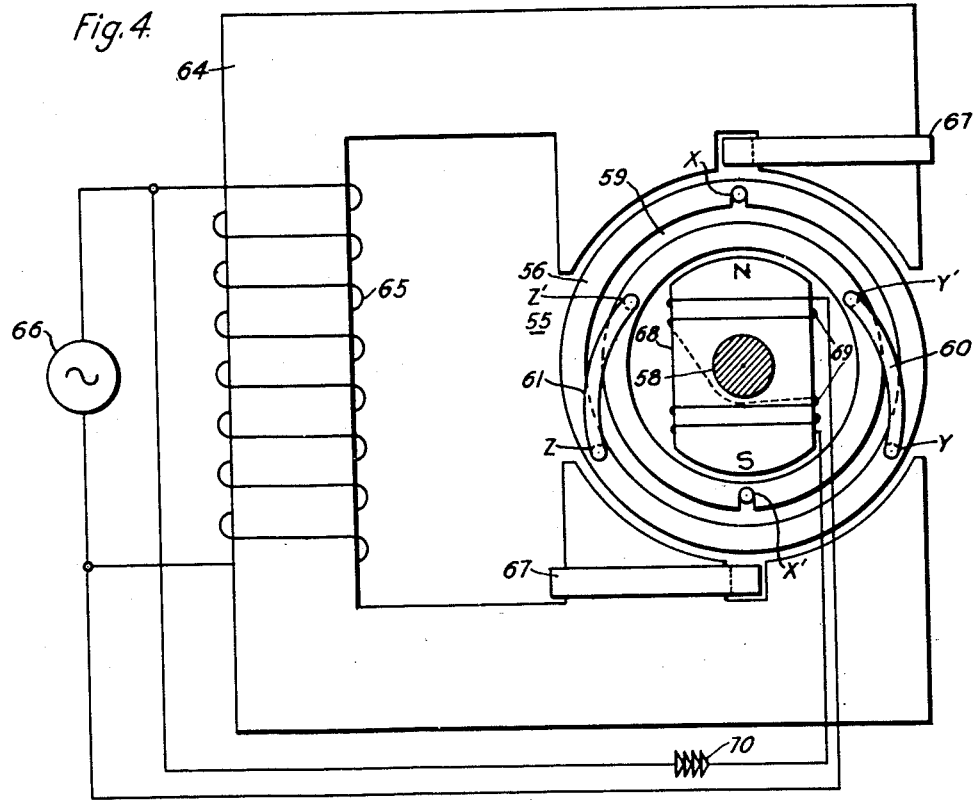
Figure 4 illustrates, diagrammatically, a third embodiment of this invention in which the two sections of the rotor are telescoped and with corresponding stators therefor.

Referring now particularly to Figure 1 of the drawings it will be noted that the reference character 10 designates, generally, a two-section rotor. The rotor 10 includes laminated magnetic cores 11 and 12 mounted for conjoint rotation on a shaft 13 (Figure 2). It will thus be understood that the rotor is formed in two distinct parts for a purpose that will be presently apparent.

Each core carries its own polyphase winding. For example, core 11 carries a polyphase winding formed by conductors, preferably copper, A, B and C. Likewise core 12 carries a polyphase winding comprising conductors A', B' and C'. As shown in Figure 2, the conductors are uniformly spaced about the periphery of the core individual thereto although, for illustrative purposes, they are not so shown in Figure 1. The conductors A, B and C are commonly connected at their left hand end by an end plate 14, preferably copper, while the conductors A', B' and C' are similarly connected at their right hand end by an end plate 15.

It is desired, for reasons which will presently be apparent, that the phase rotation of the currents flowing in the polyphase winding formed by conductors A', B' and C' be the reverse of the phase rotation of the currents flowing in the polyphase winding formed by the conductors A, B and C. To this end conductors or phases B and B' are directly interconnected by a conductor 16 while conductor or phase A is cross connected by a conductor 17 to conductor or phase C' and conductor or phase C is cross connected by a conductor 18 to conductor or phase A'. In this manner by cross connecting two of the three phases the desired phase reversal is accomplished.

The phases A, B and C and their core 11 constitute the driving portion or section of the rotor 10. Cooperating therewith is a C-shaped laminated magnetic core 21 that is arranged to be energized by a coil or winding 22 connected to a source 23 of alternating current, such as a 60 cycle source. This arrangement provides an alternating magnetic field for driving the rotor 10 since the core 11 and polyphase winding A, B, C are disposed between the poles thereof. Insofar as the arrangement just described is concerned, except for the connections 16, 17 and 18 to the phases B, A and C, it will be recognized that it forms a conventional induction motor of the single phase type. It may be made self starting by the use of shading rings or coils 24. Alternatively, a polyphase stator may be used or a split phase arrangement may be employed to provide self starting.

A unidirectional magnetic field is provided by a permanent magnet stator 25 having pole tips 26 and 27. Alternatively, a direct current electromagnet can be used. It will be observed that this unidirectional magnetic field cooperates with the core 12 and the polyphase winding A', B', C' thereon. Because of its interaction with the magnetic flux generated by current flow in the polyphase winding A', B', C', the rotor 10 is caused to operate at a synchronous speed. In the arrangement shown in Figure 1 and described hereinbefore where the stator 21 has two poles and is energized from a 60 cycle source 23, the rotor 10 will operate at a speed of 30 revolutions per second or one-half of the full synchronous speed of the rotor 10, assuming no slip.

When the rotor 10 is accelerated to a speed of 30 revolutions per second by the interaction of the alternating magnetic field between the poles of the core 21 and the flux generated by the current induced in the polyphase winding A, B, C on the core 11, the polyphase winding A, B, C will have 30 cycle currents induced therein. Since the phases A' and C' of the polyphase winding A', B', C' are cross connected to phases C and A respectively, the phase rotation in winding A', B', C' is reversed, as set forth hereinbefore, and, consequently, the magnetic field generated by the reverse phase currents in this winding will be unidirectional at this speed since the speed of rotation of the magnetic field will equal the speed of rotation of the rotor and their directions of rotation will be opposite. A synchronous torque results from the interaction of the unidirectional field generated by the winding A', B', C' and the unidirectional field provided by the permanent magnet 25. This torque prevents further acceleration of the rotor 10 above 30 revolutions per second and likewise prevents operation at a lower speed as long as operating conditions are maintained.

If desired, either the rotor section cooperating with the alternating magnetic field or the rotor section cooperating with the unidirectional field can be divided into two sections in parallel planes normal to the rotor shaft.

As illustrated in Figure 3 of the drawings, there is provided a rotor, shown generally at 30, having cores 31, 32 and 33 of laminated magnetic material mounted for rotation on a common shaft (not shown). The cores 31 and 33 together correspond to the core 11 of Figure 1 and, accordingly, each core is about one-half the size of the intermediate core 32.

The core 31 carries uniformly spaced conductors L, M and N forming a polyphase winding. These conductors are connected at their left hand ends by a copper end plate 34. Similarly the core 32 carries uniformly spaced conductors L', M' and N' and core 33 carries uniformly spaced conductors L", M" and N". The conductors forming the polyphase winding L", M" and N" are commonly connected at their right hand ends by a copper end plate 35.

It is desired, for reasons now apparent, to have the phase rotation of the currents flowing in the polyphase winding formed by conductors L', M' and N' the reverse of that of the currents flowing in windings L, M, N and L", M", N". For this purpose conductors or phases M and M' are directly connected by a conductor 36 and conductors or phases M' and M" are directly connected by a conductor 37. Conductors or phases L and N are cross connected, respectively, to conductors or phases N' and L' by conductors 38 and 39 and conductors or phases L' and N' are cross connected, respectively to conductors or phases N" and L" by conductors 40 and 41.

Cooperating with the cores 31 and 33 and the polyphase windings L, M, N and L", M", N" thereon are generally C-shaped stator cores 46 and 47, respectively. The cores 46 and 47 are of laminated magnetic material and are provided with coils or windings 48 and 49, respectively, which are connected for energization to a source 50 of alternating current, such as a 60 cycle source. The current flow in winding 49 is advanced in time phase with respect to the current flow in winding 48 by a capacitor 51 to provide a split phase effect for starting purposes. In addition the cores 46 and 47 are mounted in 90° space phase relation to complete the provision for self starting.

Cooperating with the polyphase winding L', M', N' on the core 32 is a permanent magnet stator 52 only the pole tips of which are shown and which provides a unidirectional magnetic field. The flux of this field cooperates with the flux generated by current flow in the polyphase winding L', M', N' to furnish the synchronous torque referred to hereinbefore.

Figure 5:
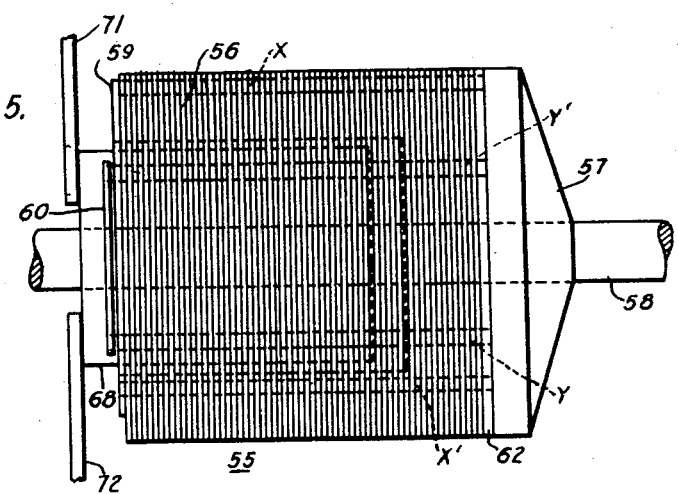
Figure 5 is a view, in side elevation, of the rotor shown in Figure 4 and of the direct current electromagnet inside the rotor.

Referring now to Figures 4 and 5 of the drawings it will be observed that there is provided a rotor, shown generally at 55, which includes a cup-shaped laminated core 56 of magnetic material carried by a support 57 fast on a shaft 58. Near the outer periphery of core 56 there are phases or conductors X, Y and Z in suitable apertures which form one polyphase winding. Telescoped with the polyphase winding X, Y, Z is a second polyphase winding formed by phases or conductors X', Y' and Z'. The latter conductors, as shown, are located in suitable apertures near the inner periphery of the cup-shaped core 56.

The polyphase windings are interconnected to provide the reverse phase rotation in the one relative to the other for the purpose set forth hereinbefore. Phases X and X' are connected by a copper ring 59. Phases Y and Y' are connected together by a conductor 60 while phases Z and Z' are connected together by a conductor 61. All of the phases or conductors X, Y, Z and X', Y', Z' are commonly connected at their right hand ends by a copper ring 62.

An alternating magnetic field for cooperating with the outer polyphase winding X, Y, Z is provided by a generally C-shaped stator core 64 of laminated magnetic material. A coil or winding 65 surrounds the core 64 and is energized from a source 66 of alternating current, such as a 60 cycle source. Shading coils or rings 67 can be provided for self starting purposes.

A unidirectional magnetic field for cooperating with the inner polyphase winding X', Y', Z' is provided by an electromagnet comprising a stator core 68 of magnetic material energized by a coil or winding 69. The coil or winding 69 is connected for energization to a suitable direct current source. For example, it can be connected through a dry type copper oxide rectifier 70 for energization to the alternating current source 66. The core 68 is held in position by suitable brackets 71 and 72, only portions of which are shown in Figure 5.

While the polyphase windings X, Y, Z and X', Y', Z' are located in the same magnetic core 56, they are spaced sufficiently far apart and react with their respective stators so that, in effect, each has its own individual magnetic circuit, such as is shown for the corresponding polyphase windings in Figure 1, for example.

It will be understood that, if desired, a polyphase alternating current stator can be used instead of the single phase stator illustrated in Figure 4 of the drawings. Likewise a permanent magnet instead of an electromagnet can be used to provide the unidirectional magnetic field.

Since certain further changes can be made in the foregoing constructions and circuit connections and different embodiments of the invention can be made without departing from the spirit and scope thereof, it is intended that all matter shown in the accompanying drawings or described hereinbefore shall be interpreted as illustrative and not in a limiting sense.

What is claimed as new is:

1. A synchronous alternating current dynamo electric device comprising, in combination, a three section rotor each section having its own magnetic circuit and the sections being disposed end to end, a three phase winding on each section, circuit means interconnecting said windings in such manner that the phase rotation of the intermediate winding is the reverse of the phase rotation of the end windings, and a stator disposed in cooperative relation to each section of said rotor, the stators cooperating with the end windings being arranged and adapted to provide alternating flux to drive the rotor and the other stator being arranged and adapted to provide a unidirectional flux for cooperating with the flux generated by the currents in the intermediate winding to cause the rotor to operate at a speed corresponding to the frequency of the rotor currents and the number of poles of said intermediate rotor section.

2. A synchronous alternating current dynamo electric device comprising, in combination, a two section rotor one section being located concentrically within the other, a three phase winding on each section, circuit means interconnecting said windings in such manner that the phase rotation of one winding is the reverse of the phase rotation of the other winding, stator means and single phase winding means thereon arranged and adapted to provide single phase alternating flux for one of said sections acting along an axis fixed in space, and stator means arranged and adapted to provide unidirectional flux acting along an axis fixed in space for the other of said sections, said rotor operating at a constant speed relative to the frequency of said alternating flux.

3. A synchronous alternating current dynamo electric device comprising, in combination, a two section rotor one section being located concentrically within the other, a three phase winding on each section, circuit means interconnecting said windings in such manner that the phase rotation of one winding is the reverse of the phase rotation of the other winding, a stator disposed in cooperative relation with the outer section of said rotor, a single phase winding on said stator arranged and adapted to provide a single phase alternating flux in said outer section acting along an axis fixed in space for driving the rotor, and a stator disposed in cooperative relation with and inside of the inner section of said rotor and arranged and adapted to provide unidirectional flux acting along an axis fixed in space to cause the rotor to operate at a synchronous speed and at a fixed angular velocity relative to the frequency of said alternating flux.

EDMUND O. SCHWEITZER, JR.

REFERENCES CITED

The following references are of record in the file of this patent:

UNITED STATES PATENTS

| Number | Name | Date |
|---|---|---|
| 587,340 | Steinmetz | Aug. 3, 1897 |
| 1,331,940 | Hobart | Feb. 24, 1920 |
| 1,591,435 | Rhode | July 6, 1926 |
| 1,628,464 | Hobart | May 10, 1927 |
| 1,723,906 | Alexanderson | Aug. 6, 1929 |
| 1,848,091 | Winther et al | Mar. 1, 1932 |
| 1,875,763 | Robinson | Sept. 6, 1932 |
| 1,893,346 | Winther et al. | Jan. 3, 1933 |
| 2,039,322 | Lell | May 5, 1936 |
| 2,061,983 | Rossman | Nov. 24, 1936 |
| 2,444,077 | Weathers | June 29, 1948 |

FOREIGN PATENTS

| Number | Country | Date |
|---|---|---|
| 471,113 | Great Britain | Aug. 23, 1937 |
| 348,341 | Germany | Feb. 6, 1922 |
| 425,262 | France | Mar. 31, 1911 |

OTHER REFERENCES

Theory and Calculations of Electrical Apparatus by Steinmetz, 1st edition, 1917, pp. 58 and 71 to 78.